United States Patent [19]

Matsui et al.

[11] Patent Number: 5,380,510
[45] Date of Patent: Jan. 10, 1995

[54] SILICA GEL MANUFACTURED BY A HYDROTHERMAL POLYMERIZATION FOLLOWING GELATIZATION OF SILICA HYDROGELS

[75] Inventors: Takashi Matsui, Tsuruga; Nobuki Watanabe, Hyuga, both of Japan; Masayuki Arimura, Eugene, Oreg.; Eiji Kanemaru, Hyuga, Japan; Yuzo Horinouchi, Nobeoka, Japan; Mutsuhiro Ito, Hyuga, Japan

[73] Assignee: Fuji-Davison Chemical Ltd., Japan

[21] Appl. No.: 166,261

[22] Filed: Dec. 9, 1993

Related U.S. Application Data

[63] Continuation of Ser. No. 853,705, filed as PCT/JP91/01404, Oct. 11, 1991, abandoned.

[30] Foreign Application Priority Data

Oct. 12, 1990 [JP] Japan ................... 2-274643

[51] Int. Cl.⁶ ............................................ C01B 33/14
[52] U.S. Cl. ................... 423/338; 252/315.6; 502/233
[58] Field of Search ............... 423/335, 338; 252/315.2, 315.6; 502/233

[56] References Cited

U.S. PATENT DOCUMENTS

| | | |
|---|---|---|
| 2,561,304 | 7/1951 | Hazel . |
| 3,681,017 | 8/1972 | Butcher et al. .................. 423/338 |
| 4,230,679 | 10/1980 | Mahler et al. .................. 423/325 |

FOREIGN PATENT DOCUMENTS

| | | |
|---|---|---|
| 47-24359 | 7/1972 | Japan . |
| 50-161484 | 12/1975 | Japan . |
| 1174376 | 8/1985 | U.S.S.R. .................. 423/338 |

OTHER PUBLICATIONS

Hench et al., "Sol–Gel Process", Chem Rev., vol. 90 No. 1, Jan 1990, pp. 33–72.

*Primary Examiner*—Olik Chaudhuri
*Assistant Examiner*—Ken Horton
*Attorney, Agent, or Firm*—Davis, Bujold & Streck

[57] ABSTRACT

This invention provides a method for manufacturing silica gels in a form of scales or needles having a pore volume and a specific surface area being relatively large and being controlled. Silicic acid sol is frozen, crystallized and deposited in gaps among crystal faces of crystals of solvent of the sol, thus obtaining the frozen silica hydrogels in the form of scales or needles. After unfreezing the frozen silica hydrogels, a hydrothermal polymerization is carried out. Subsequently, the silica hydrogels are dried, thus obtaining the silica gels in the form of scales or needles. Furthermore in the invention, by controlling the gelation time period of silica sol, the silica gels with their configuration controlled can result from even inexpensive silica sol. The invention has the advantage that a freeze-drying step is not required: just through freezing, unfreezing, washing and hydrothermal polymerization steps, the physical properties of the silica gels can be controlled.

20 Claims, No Drawings

SILICA GEL MANUFACTURED BY A HYDROTHERMAL POLYMERIZATION FOLLOWING GELATIZATION OF SILICA HYDROGELS

This is a continuation of copending application(s) Ser. No. 07/853,705 filed as PCT/JP91/01404, on Oct. 11, 1991, now abandoned.

TECHNICAL FIELD

This invention relates to a method for manufacturing silica gels, particularly to a method for manufacturing silica gels in a form of scales or needles having a pore volume and a specific surface area being relatively large and being controlled.

1. Background of the Invention

Various methods for manufacturing silica gels are conventionally proposed and put into practice. Most of the methods are for manufacturing spherular silica gel particles. A method for manufacturing silica gels in a form of scales or needles has not been reviewed sufficiently. In many of the conventional methods for obtaining silica gel particles in the form of scales or others through a freezing step, silica sol is used, but in none of the methods the gelation time period of silica sol is controlled at the freezing step.

This invention has been developed to solve the above problem. An object of the invention is to provide silica gels in a form of scales or needles having a pore volume and a specific surface area being relatively large and being controlled.

2. Summary of the Invention

The above object of the invention can be attained easily by a method for manufacturing silica gels in a form of scales or needles, comprising the steps of depositing silicic acid sol in gaps among crystal faces of crystals of solvent of sol crystallized by freezing the silicic acid sol, thus obtaining frozen silica hydrogels in the form of scales or needles; unfreezing the frozen silica hydrogels; conducting a hydrothermal polymerization on the silica hydrogels; and drying the silica hydrogels.

In the invention the silica gels with their configuration controlled can be obtained using inexpensive silica sol by controlling the gelation time period of the silica sol. This invention has the advantage that a freeze-drying step is not required: the physical properties of resulting silica gels can be controlled just through freezing, unfreezing, washing and hydrothermal polymerization steps.

DESCRIPTION OF THE PREFERRED EMBODIMENTS

The invention will now be explained in detail.

In the invention a material silicic acid sol is not limited especially. For example, a silicic acid sol (reactant sol) obtained through the reaction of silicic acid soda and sulfuric acid, a colloidal silica sol (its tradename is Snotex), a silica sol prepared through an ion exchange method and other sol can be used.

The colloidal silica sol and the silica sol prepared through the ion exchange method, however, generally have a large sol particle diameter. Therefore, the silica gels having a large specific surface area are so difficult to manufacture that the reactant sol is comparatively effective for use. When the colloidal silica sol, which usually has the particle diameter of 8 nm to 50 nm, is dried, resulting silica gels have the surface area of 375 m²/g at maximum (as measured by the Brunauer, Emmett and Teller (B.E.T.) method), which is the limitation of the surface area that the freezing gelation method can provide. The reactant sol has much smaller sol particle diameter of 2 nm to 3 nm, thus obtaining the silica gels having the surface area of about 1,000 m²/g provided that the reactant sol undergoes no contraction at the drying step. The reactant sol, however, substantially contracts while being dried, thus forming micropore type silica gels. Specifically, the surface area of the silica gels is reduced to between 700 m²/g and 800 m²/g.

The material silicic acid sol is usually used while the gelation time period thereof is controlled. The reactant sol, however, can be controlled easily by a silica sol concentration and a pH value (the concentration of excess sulfuric acid). For example, when the sol concentration is in the range of 1% to 22% by weight, the gelation time period can be controlled arbitrarily in a wide range from a moment to 24 hours by adjusting the pH value properly.

The gelation time period and the sol concentration at normal temperature have the following relation:

| Sol concentration (%) | 1 | 5 | 10 | 15 | 20 |
|---|---|---|---|---|---|
| Sol pH | 9 | 9 | 2–4 | 2–3 | 0–3 |
| Gelation time period (H) | 100 | 24 | 0.1–5 | 0.1–2 | 0.01–2 |

In the invention, the silicic acid sol is first frozen, to crystalize the solvent, and deposited in the interstitial gaps between the crystal faces of the crystals of the solvent of the sol, thus obtaining the frozen silica hydrogels in the form of scales or needles.

At the above freezing step, the configuration of the frozen silica hydrogels varies with the freezing temperature, which is an especially important requirement for obtaining the frozen silica hydrogels in the form of scales or needles.

It is not necessarily clarified why the configuration of the frozen silica hydrogels varies with the freezing temperature. This is, however, probably because the configuration of the crystals is influenced by the freezing speed which differs with the freezing temperature. Therefore, both the freezing temperature and the freezing time period need to be appropriately selected so as to obtain the frozen silica hydrogels in the form of scales or needles.

Therefore, in the invention, the freezing temperature is in the range of about −10° C. to about −200° C. The freezing time period is usually within one minute, preferably within 30 seconds, and further preferably within 10 seconds.

In the invention, after the freezing and crystallizing steps, the frozen substances are preferably left frozen for a predetermined time period. This is because such treatment further facilitates the control of the physical properties of the obtained silica gels. The storage time period, for which the frozen substances are left frozen, depends on the concentration and pH value of the material silicic acid sol and the freezing temperature and condition, is selected from the range from several minutes to 24 hours, and needs to be longer than the gelation time period at normal temperature. The concentration of the sol with layers separated through crystallization increases, and the gelation speed is accelerated. Since the substances are frozen, however, the gelation temperature lowers and the gelation time period lengthens. Because of such contradiction the gelation time period cannot be defined clearly. Therefore, the frozen substances must be partially unfrozen to confirm that the gelation is substantially taking place.

In the invention, a freezing device is not specified especially; however, a preferable freezing device is designed to spray a material silicic acid sol onto a cooled wall to freeze. An example of such a freezing device is composed of a cylinder having a means for cooling its inner wall (cooling medium) and having a scratching scraper. Freezing devices will now be explained.

In a cylindrical freezing device, a portion for expanding cooling medium (Freon or other cooling medium) is provided in a cylindrical portion. The expansion of the cooling medium provides a freezing portion (inner cylindrical portion), into which silicic acid sol is introduced to freeze. A scratching blade having a limited length is provided on the inner wall of the cylindrical portion so as to slowly rotate scratching the frozen substances. In a belt freezer a steel belt is cooled by cooling medium while moving, and provides a freezing face. Silicic acid sol is introduced onto the steel belt to freeze, and the frozen substances are peeled off at the winding portion of the driving mechanism of the steel belt. A batch type freezer is composed of sol containers arranged in a large refrigerator for freezing sol.

In the above freezing devices, the freezing temperature (substantially, the temperature of the cooled wall) and the freezing time period can be controlled easily by the circulating amount of the cooling medium and by the spraying amount of the silicic acid sol. Necessary heating value is calculated using the specific heat, introducing temperature and cooling temperature of the silicic acid sol. The freezing temperature can be set according to the type of the cooling medium in use (Freon R502, R22, R12 and the like) and by controlling an expansion valve, but becomes higher than the set temperature if the above heating value exceeds the cooling capacity (heat value resulting from the evaporation of the cooling medium). The freezing time period is controlled in various ways according to the type of the freezing device. For example, when a scratching mechanism is provided on the freezing device, the freezing time period can be controlled according to the scratching time period. In the batch type freezer the freezing time period can be controlled according to the time period required for taking the containers out of the refrigerator. When sufficient holding time period cannot be obtained after scratching, the frozen substances need to be stored in the freezing device.

Subsequently, in the invention the frozen silica hydrogels collected from the freezing device are unfrozen, and a hydrothermal polymerization is conducted.

When the reactant sol is used as the material silicic acid sol, impurities such as salt (sodium sulfate) are preferably removed by an appropriate means from the silica hydrogels prior to the hydrothermal polymerization. The impurities are usually removed at a washing step. Specifically, the unfrozen substances are put into a bucket, water is added to the bucket, the content in the bucket is stirred and is left settled, and supernatant liquid is poured off from the bucket. This procedure is repeated until the electric conductivity of the supernatant liquid decreases. Instead of this decantation method, centrifugal separation or other method can be used.

The above hydrothermal polymerization is conducted by controlling the pH value, temperature and treatment time period of the silica hydrogel slurry obtained by unfreezing the silica hydrogels, and provides the silica gels with the pore volume and the specific surface area that are relatively large and are controlled to almost constant values.

The water content of the silica hydrogels is determined almost at the stage of crystallization to be 60% by weight usually. Therefore, the maximum value of the pore volume is 1.5 ml/g when the water content is 60% by weight and a silica framework undergoes no contraction. Substantially, the contraction of the silica framework and other conditions result in only a small pore volume and also a small specific surface area. These physical properties often differ, influenced by the physical properties of the material silicic acid sol and the freezing condition. Consequently, it is difficult to obtain the silica gels having constant physical properties. In the invention, however, the hydrothermal polymerization solves these disadvantages and provides the silica gels having the pore volume and the specific surface area that are relatively large and controlled to almost constant values.

The condition of the hydrothermal polymerization varies with the desired pore volume and the desired specific surface area. Although the determined condition cannot be expected, the pH value is preferably between 3 and 9, and the temperature is preferably between 20° C. and 160° C. The treatment time period can be selected from an appropriate range according to the desired physical properties. The hydrothermal polymerization is usually carried out at the pH value of 6 to 9 and at the temperature of 40° C. to 90° C. for the treatment time period of two hours to 24 hours.

Subsequently, in this invention, by drying the silica hydrogels, the desired silica gels are obtained. An oven dryer, a shelf dryer, a flash dryer or other known dryer can be used for the drying step.

In the invention, however, the shelf dryer or the flash dryer, each of which attains a quick drying, is desirable for use. Such dryer prevents the silica framework from contracting after being dried and increases the pore volume and the specific surface area. Specifically, the resulting silica gels in the form of scales or needles have the pore volume of 0.2 ml/g to 1.5 ml/g and the specific surface area of 100 $m^2/g$ to 1,000 $m^2/g$.

On the other hand, when the oven dryer is used at the drying step, the resulting silica gels usually have the pore volume in the range of 0.2 ml/g to 1.2 ml/g and the specific surface area in the range of 100 $m^2/g$ to 700 $m^2/g$.

BEST MODE FOR CARRYING OUT THE INVENTION

Preferred embodiments of the invention will now be explained further in details. The invention is not limited to the embodiments illustrated and described as far as other various embodiments do not exceed the scope of the invention.

EMBODIMENT 1

A silicic acid sol (reactant sol) resulting from the reaction of silicic acid soda and excess sulfuric acid and having the pH value of 3.5 and the sol concentration of 8% by weight was used as a material silicic acid sol. At a freeze-gelating step, a freezing device was used which comprises a cylinder having a means for cooling its inner wall (cooling medium) and having a scratching scraper.

At the freeze-gelating step, the freezing temperature (the temperature of the inner wall) was adjusted to about −40° C. and the freezing time period was adjusted to about one second, by controlling the circulating amount of the cooling medium and the spraying amount of the silicic acid sol.

Subsequently, the frozen silica hydrosol was collected by the scratching scraper and was left frozen for about 16 hours in the freezing device, thus obtaining the frozen silica hydrogels.

Subsequently, the frozen silica hydrogels were unfrozen in a heating container. By holding the frozen silica hydrogels in the heating container for six hours at the pH value of 7.0 and at the temperature of 80° C., a hydrothermal polymerization was conducted.

The silica hydrogels were rinsed with water to remove sodium sulfate therefrom prior to the above-mentioned hydrothermal polymerization.

After the hydrothermal polymerization, the silica hydrogels were collected from the heating container and dried in a shelf dryer, so that the water content of the silica hydrogels was 0.5% by weight, thus obtaining silica gels.

The silica gels had the pore volume of 0.56 ml/g, the specific surface area of 321 $m^2/g$ and the form of scales.

EMBODIMENT 2

The freezing condition of the embodiment 1 was altered: the freezing temperature was about −60° C. and the freezing time period was about one second. Other conditions for obtaining silica gels were the same as those of the embodiment 1.

The silica gels thus obtained had the pore volume of 0.64 ml/g, the specific surface area of 358 $m^2/g$ and the form of needles.

EMBODIMENT 3

By holding the silica hydrogels resulting from the embodiment 1 at the pH value of 7.0 and at the temperature of 40° C. for three hours, a hydrothermal polymerization was carried out.

Prior to the above-mentioned hydrothermal polymerization, the silica hydrogels were rinsed with water to remove sodium sulfate therefrom.

Subsequently, the silica hydrogels were collected from a heating container and dried by a flash dryer, so that the water content was 0.5% by weight, thus obtaining silica gels.

The resulting silica gels had the pore volume of 0.56 ml/g, the specific surface area of 682 $m^2/g$ and the form of scales.

COMPARISON

In the same way as the embodiment 1, the freeze-gelation step was carried out and the frozen silica hydrogels were obtained.

The silica hydrogels were just rinsed with water and dried in a shelf dryer, so that the water content of the silica hydrogels was 0.5% by weight, thus obtaining silica gels.

The resulting silica gels had the pore volume of 0.16 ml/g, the specific surface area of 88 $m^2/g$ and the form of scales.

INDUSTRIAL AVAILABILITY

By the method of the invention explained above, the silica gels can be manufactured that have the pore volume and specific surface area being relatively large and being controlled. Furthermore in this invention, even if inexpensive silica sol is used, by controlling the gelation time period of the silica sol, the configuration of the resulting silica gels can be controlled. This invention has the advantage that a freeze-drying step is not required: just through freezing, unfreezing, washing and hydrothermal polymerization steps, the physical properties of the silica gels can be controlled. Consequently, the invention contributes much to the industrial manufacturing field of silica gels.

We claim:

1. A method for manufacturing silica gels in a form of scales or needles, comprising the steps of:
   (a) forming a solution of silica sol in a solvent;
   (b) freezing the solution so as to crystallize said solvent and deposit said silica sol in gaps formed between crystallized faces of said crystallized solvent;
   (c) storing the frozen solution to gel the silica sol and obtain frozen silica hydrogels in the form of scales or needles; then
   (d) unfreezing the frozen silica hydrogels after storing the frozen solution; then
   (e) conducting a hydrothermal polymerization on the unfrozen silica hydrogels following the freezing and unfreezing steps; and finally
   (f) drying the silica hydrogels to form the silica gels.

2. A method for manufacturing silica gels as in claim 1 in which the gelation time period at step (c) is controlled according to the concentration and pH value of silica sol.

3. A method for manufacturing silica gels as in claim 1 in which the concentration of silica sol at step (a) is between 1% and 22% by weight.

4. A method for manufacturing silica gels as in claim 1 in which the freezing time period at step (b) is performed in less than one minute.

5. A method for manufacturing silica gels as in claim 1 in which the freezing time period and the freezing temperature at step (b) are controlled according to the circulating amount of cooling medium and the spraying amount of the silicic acid sol.

6. A method for manufacturing silica gels as in claim 1 in which the freezing temperature at step (b) is controlled according to the type of the cooling medium and by adjusting an expansion valve.

7. A method for manufacturing silica gels as in claim 1 in which the crystallized silica hydrogels at step (b) have a water content of 60% by weight.

8. A method for manufacturing silica hydrogels as in claim 1 in which the freezing temperature at step (b) is between −10° C. and −200° C.

9. A method for manufacturing silica gels as in claim 1 in which frozen and crystallized substances are stored for several minutes to 24 hours, and are then unfrozen at step (d).

10. A method for manufacturing silica gels as in claim 1 which the hydrothermal polymerization at step (e) is conducted at the pH value of 3 to 9 and at the temperature of 20° C. to 160° C.

11. A method for manufacturing silica gels as in claim 1 in which the hydrothermal polymerization at step (e) is conducted at the pH value of 6 to 9 and at the temperature of 40° C. to 90° C. for the time period of two hours to 24 hours.

12. A method for manufacturing silica gels as in claim 1 in which a washing step precedes the hydrothermal polymerization at step (e).

13. A method for manufacturing silica gels as in claim 1 in which an oven dryer is used at step (f) and the silica gels after being dried have the pore volume of 0.2 ml/g to 1.2 ml/g and the specific surface area of 100 m$^2$/g to 700 m$^2$/g.

14. A method for manufacturing silica gels as in claim 1 in which a shelf dryer or a flash dryer is used at step (f) and the silica gels after being dried have the pore volume of 0.2 ml/g to 1.5 ml/g and the specific surface area of 100 m$^2$/g to 1,000 m$^2$/g.

15. A method for manufacturing silica gels as in claim 1 in which the silica hydrogels, after being dried at step (f), have a water content of 0.5% by weight.

16. A method of manufacturing silica gels in a form of scales or needles having a desired surface area, comprising the steps of:
   (a) forming a solution of silica sol in a solvent; then
   (b) freezing the solution so as to crystallize said solvent and deposit said silica sol in gaps formed between crystallized faces of said crystallized solvent; then
   (c) storing the frozen solution until the silica sol gels thereby obtaining silica hydrogels in the form of scales or needles; then
   (d) unfreezing the silica hydrogels; then
   (e) conducting a hydrothermal polymerization on the silica hydrogels following the freezing and the unfreezing steps; and finally,
   (f) drying the silica hydrogels to form the silica gels whereby the formed silica gels each have a constant pore volume and surface area.

17. A method of manufacturing silica gels as in claim 16 further comprising the step of confirming that gelation of the silica hydrogels has occurred prior to unfreezing the silica hydrogels.

18. A method of manufacturing silica gels as in claim 17 further comprising the step of washing the unfrozen silica hydrogels to remove impurities prior to the hydrothermal polymerization step.

19. A method of manufacturing silica gels as in claim 16, further comprising the step of unfreezing a portion of the stored frozen solution, to confirm that gelation has occurred prior to unfreezing the silica hydrogels.

20. A method of manufacturing silica gels as in claim 19, wherein the drying step occurs quickly to prevent the silica gels from contracting, after being dried, thereby to increase the pore volume and the surface area of the formed silica gels.

* * * * *